United States Patent [19]

Underwood

[11] Patent Number: 5,338,257
[45] Date of Patent: Aug. 16, 1994

[54] COMBINE SIEVE DISTRIBUTOR APPARATUS

[75] Inventor: Mark R. Underwood, Burr Oak, Kans.

[73] Assignee: Probe Adventures, Inc., Burr Oak, Kans.

[21] Appl. No.: 1,087

[22] Filed: Jan. 6, 1993

Related U.S. Application Data

[63] Continuation-in-part of Ser. No. 890,716, May 29, 1992, Pat. No. 5,282,771.

[51] Int. Cl.5 ............................................. A01F 12/32
[52] U.S. Cl. ............................................ 460/8; 460/9; 460/95; 460/901
[58] Field of Search ................ 460/8, 9, 10, 94, 95, 460/96, 147, 91, 901, 902, 903

[56] References Cited

U.S. PATENT DOCUMENTS

| | | |
|---|---|---|
| 2,382,965 | 8/1945 | Appel . |
| 2,617,518 | 11/1952 | Anderson . |
| 2,656,194 | 10/1953 | Saulsbury . |
| 2,675,809 | 4/1954 | Aber . |
| 3,092,116 | 6/1963 | Stroburg et al. . |
| 3,108,064 | 10/1963 | Grant . |
| 3,186,548 | 6/1965 | Stroburg et al. . |
| 3,367,496 | 2/1968 | Cockle et al. . |
| 3,497,299 | 2/1970 | Sietmann et al. . |
| 3,581,746 | 6/1971 | Looks . |
| 4,535,788 | 8/1985 | Rowland-Hill et al. .............. 56/209 |
| 4,548,214 | 10/1985 | Sheehan et al. ....................... 56/209 |
| 4,557,276 | 12/1985 | Hyman et al. ............................ 460/9 |
| 4,573,483 | 3/1986 | Raineri . |
| 4,897,071 | 1/1990 | Desnijder et al. ..................... 460/10 |
| 4,968,284 | 11/1990 | Klimmer et al. ......................... 460/8 |
| 4,968,285 | 11/1990 | Schuhmacher ......................... 460/97 |
| 5,041,059 | 8/1991 | Ricketts et al. ...................... 460/101 |

OTHER PUBLICATIONS

KHD Deutz Fahr Service Training Manual, (date unknown).

*Primary Examiner*—Terry Lee Melius
*Attorney, Agent, or Firm*—James E. Bradley

[57] ABSTRACT

A sieve for a grain combine has a plurality of longitudinal sections. Each section is pivotally mounted in a sieve frame. A sensing means senses if the combine is leaning to one side. The sensing means controls a drive and linkage mechanism for pivoting each of the sections relative to the sieve frame to maintain each section generally horizontal. Elastomeric seals extend between each of the sections. A distributor at the forward end of the sieve has a pair of sprockets and a chain extending perpendicular to the longitudinal axis of the sieve. Fingers protrude longitudinally from the chain. The chain is driven when the combine leans.

30 Claims, 4 Drawing Sheets

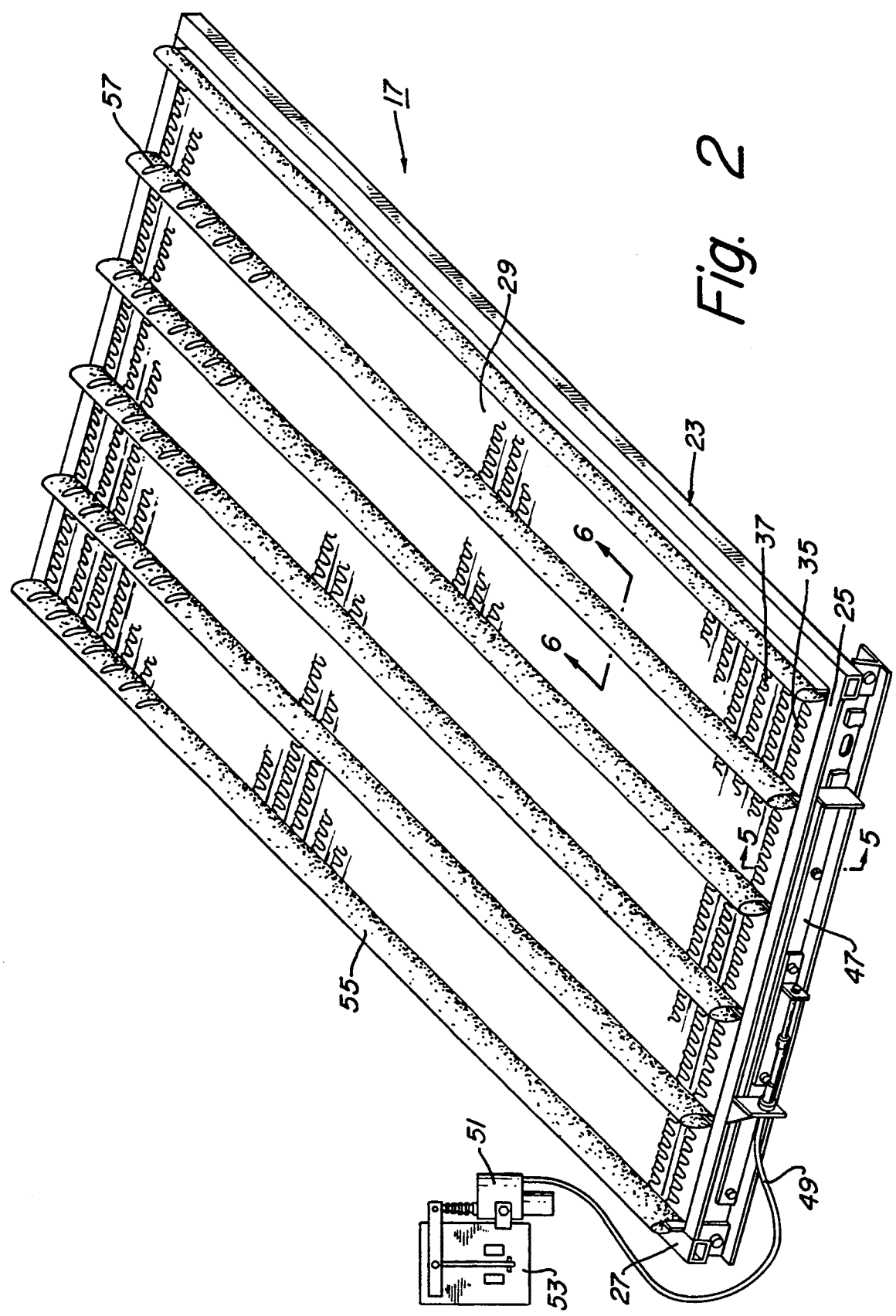

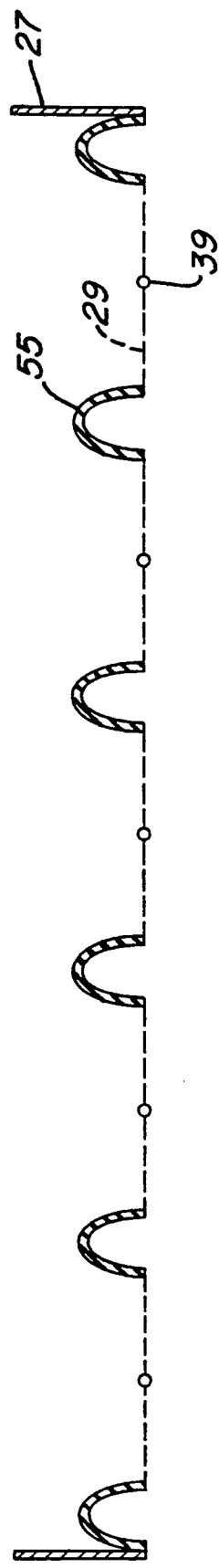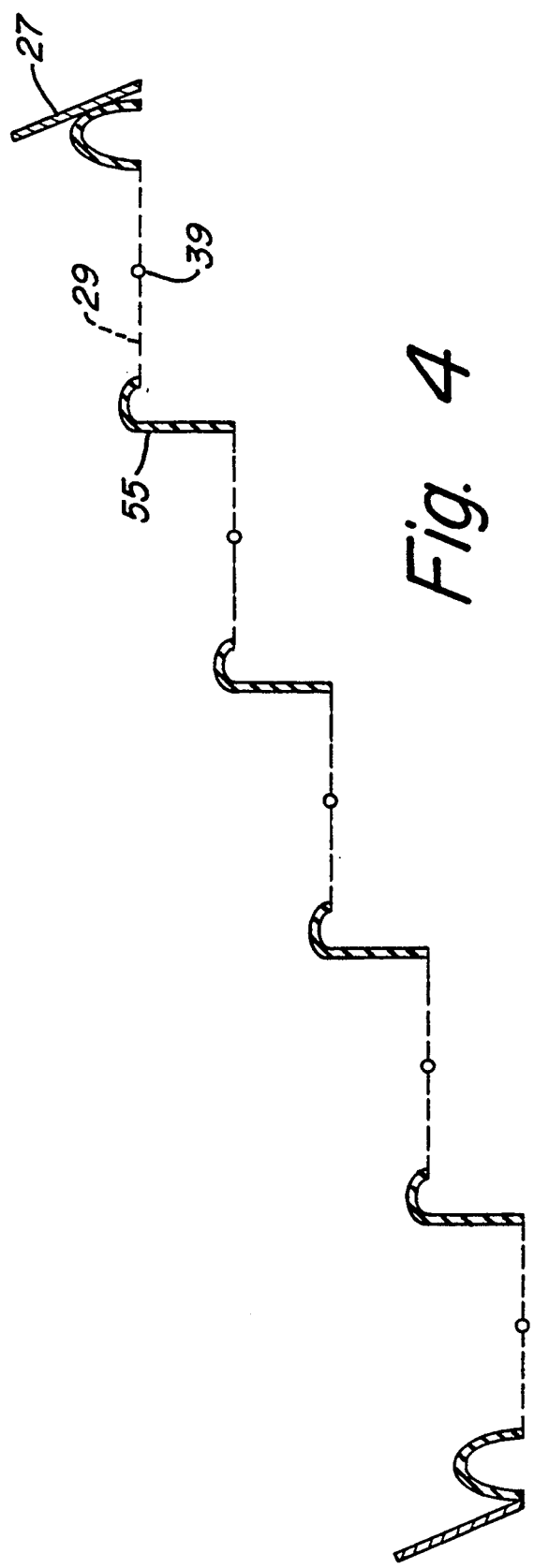

COMBINE SIEVE DISTRIBUTOR APPARATUS

CROSS REFERENCE TO RELATED APPLICATION

This application is a continuation-in-part of U.S. Pat. application Ser. No. 07/890,716, filed May 29,1992 now U.S. Pat No. 5,282,771.

BACKGROUND OF THE INVENTION

1. Field of the invention

This invention relates in general to combines for harvesting grain, and in particular to an apparatus for maintaining the sieve of the combine in a level position while the combine is leaning sideways on a hillside.

2. Description of the Prior Art

Combines of the type concerned herein are large, self-propelled vehicles for cutting and threshing grain. A combine has a header which has a blade that will cut the crop. An auger mounted to the header delivers the crop up into a threshing chamber. The threshed grain falls onto a set of upper and lower sieves. The sieves are oscillated in longitudinal directions and have a large number of fingers. Air blows upward through the sieves. The sieves separate the grain from the chaff, with the grain falling through slots between the fingers into a collection area for transport upward to a bin. The chaff will be blown from the combine.

A combine works best while it is level. The grain will be evenly distributed across the sieves while the sieves are level. However, a large percentage of the tillable acreage in the United States has hillside grades and terraces. Often it is necessary to cut the hillsides and terraces in back and forth sweeps, with the combine leaning laterally. When the combine leans, grain will be distributed onto the sieves unequally. The grain will pile up on certain portions of the sieves. This reduces the effectiveness of the separation between the chaff and the threshed grain.

Hillside combines are available. These combines have complex levelling mechanisms that level the entire combine relative to the header. While workable, levelling the entire combine is expensive.

Another approach to preventing uneven distribution of grain on the sieves is to place longitudinal dividers in the grain distributing pan that distributes the grain onto the sieves. Still, grain can pile up on one side. Also, mechanisms to level the grain distributing pan or to level the sieves relative to the rest of the combine have been proposed in the patented art.

SUMMARY OF THE INVENTION

In this invention, at least the upper sieve will employ a levelling mechanism. The levelling mechanism divides the sieve into a number of separate longitudinal sections. Each section will be only a few inches wide and will extend the length of the sieve. Each section mounts to the overall frame of the sieve by a pivot pin. The pivot pin enables each section to pivot about a pivot axis that is parallel to the longitudinal axis of the combine.

The apparatus includes means for sensing the lateral inclination of the combine. The sensor controls an electric motor, which through linkage members, will pivot all of the sections simultaneously when the sieve frame inclines laterally. While leaning, the sieve will have a stair-step configuration.

A distributor on the forward end of the sieve has a pair of sprockets spaced laterally apart from each other. A chain extends around the sprockets in a loop. Wire fingers are mounted to the chain and extend over the forward portion of the sieve in a longitudinal direction. A motor drives the sprocket to cause the wire fingers to move laterally across the sieve when the combine is leaning. The wire fingers reduce build-up of chaff on the low side of the upper sieve.

BRIEF DESCRIPTION OF THE DRAWINGS

FIG. 2 is a perspective view of the upper sieve of the combine of FIG. 1.

FIG. 3 is a schematic sectional view illustrating the sieve of FIG. 2, shown in a position while the combine is level in a lateral direction.

FIG. 4 is a schematic view illustrating the sieve of FIG. 2 while the combine is leaning laterally.

DETAILED DESCRIPTION OF THE INVENTION

Figure 1:
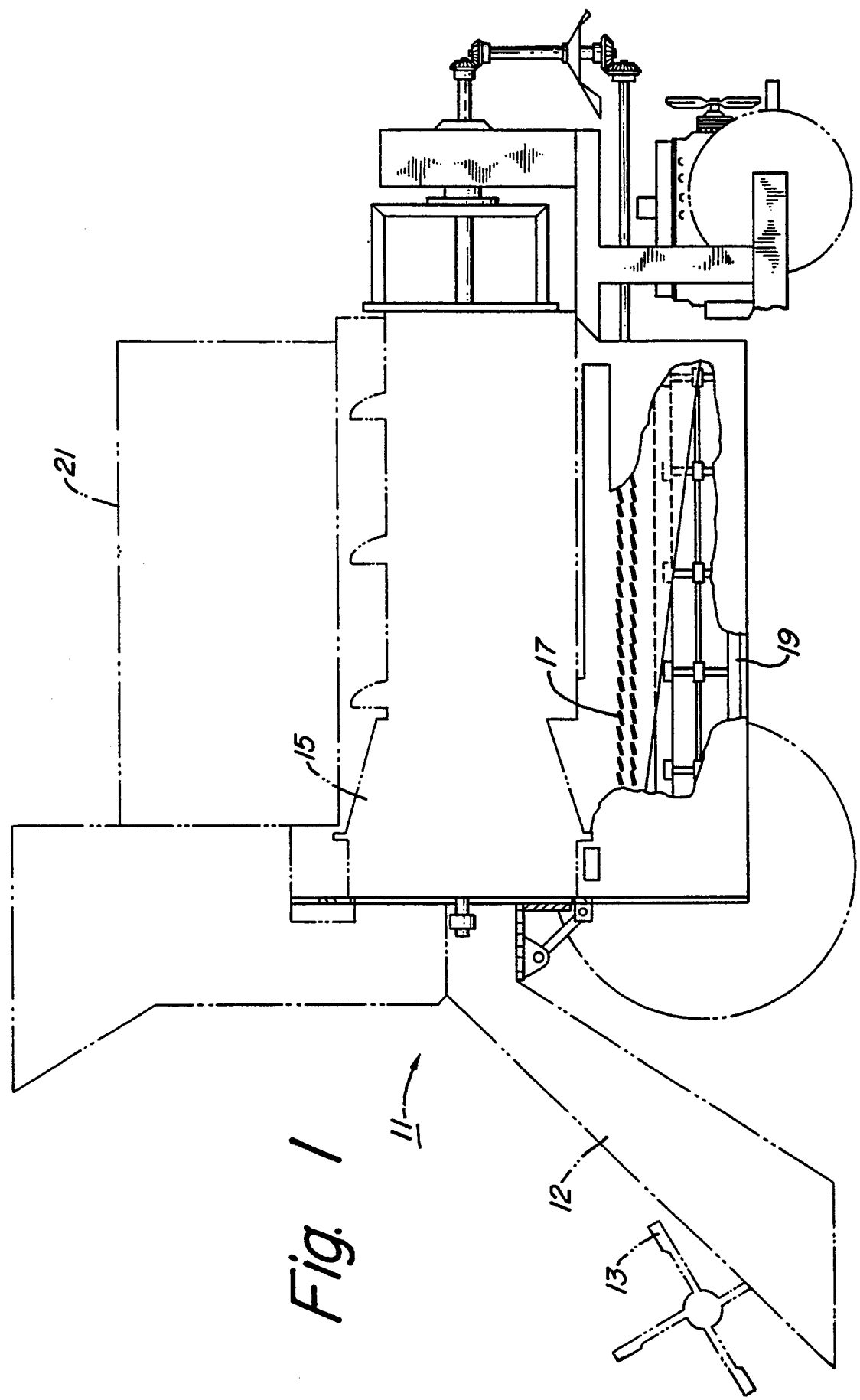
FIG. 1 is a schematic view illustrating a combine having a sieve constructed in accordance with this invention, but shown schematically.

Referring to FIG. 1, combine 11 has a header 12. Header 12 has a blade (not shown) that will cut the crop, which is pushed inward by a rotating reel 13. An auger (not shown) delivers the crop into a threshing rotor 15. Threshing rotor 15 will thresh the grain, with the grain along with some chaff, being delivered downward to upper and lower sieves 17. Sieves 17 are oscillated in longitudinal directions approximately 270 times per minute. The reciprocation is about 1½ inch in a longitudinal direction for each oscillation.

A blower 19 located below sieves 17 distributes air upward through sieves 17. Grain will fall through sieves 17 into a collecting area where it will be delivered upward to a storage bin 21. Chaff will not fall through the sieves 17, rather will be discharged out the combine 11.

In the preferred embodiment, only the upper sieve 17 has a levelling mechanism, however, the lower sieve 17 could also have a similar levelling mechanism. Referring to FIG. 2, upper sieve 17 is shown removed from combine 11. Sieve 17 has a rectangular sieve frame 23. Sieve frame 23 includes lateral frame members 25 at the forward and rearward ends of sieve frame 23. Longitudinal frame members 27 connect the lateral frame members 25. Longitudinal frame members 27 extend parallel with the longitudinal axis of combine 11. Sieve frame 23 mounts to a conventional oscillating mechanism (not shown) which oscillates sieve frame 23 relative to combine 11. Sieve frame 23 is not capable of tilting about the longitudinal axis relative to combine 11. If combine 11 leans laterally to one side, sieve frame 23 will also lean the same degree.

A plurality of sieve sections 29 (five shown) mount pivotally to sieve frame 23. Each sieve section 29 is rectangular, extending the full length of sieve frame 23 and being a few inches in width.

A plurality of fingers 35 mount to each sieve section 29. Each finger 35 is a generally flat plate extending the width of each sieve section 29. A plurality of slots 37 extend longitudinally partially through each finger 35, dividing each finger 35 into a number of finger-like protrusions, between which threshed grain may pass.

Sieve sections 29 are mounted pivotally to sieve frame 23 by pivot pins 39. Each pivot pin 39 is located on an axis that is parallel to the longitudinal axis of sieve frame 23. FIGS. 3 and 4 illustrate the tilting movement of each sieve section 29 about pivot pins 39.

A drive member 47, shown in FIG. 2, extends along the lateral frame member 25. Drive member 47 will move back and forth relative to lateral frame member 25. This movement pivots or rotate lateral section member 33 and the entire sieve section 29 about pivot pin 39.

A cable 49 connects to an electric motor 51 for moving drive member 47 when combine 11 changes its lateral or leaning inclination. An inclinometer 53 of a conventional design senses the leaning of combine 11 and provides a signal to electric motor 51 to move drive member 47.

Referring again to FIG. 2, a longitudinal elastomeric seal 55 extends between each of the sieve sections 29. Seal 55 is generally an inverted U-shaped member. It has a lower edge of one leg secured to an upper edge of one sieve section 29. The other leg secures to the upper edge of the sieve section 29. Seal 55 prevents grain and chaff from falling between the sections 29. Seal 55 also accommodates the levelling movement, as illustrated in FIGS. 3 and 4.

As shown in FIG. 2, preferably a plurality of holes 57 are located near the forward end of each seal 55. Holes 61 are located on both sides of each seal 55, except the seals 55 that join the longitudinal frame members 27 on each side. The holes 57 in these seals 55 will be directed only laterally inward. The holes 57 in the seals 55 oppose each other across each of the sections 29. Air from blower 19 (FIG. 1) will discharge through holes 57 to urge the grain toward the centers of each of the sections 29.

Then the operator will begin cutting crop in a conventional manner. The crop will be transported up header 12 (FIG. 1) into threshing rotor 15. Threshed grain will fall onto the sieve 17. Blower 19 discharges air through sieve 17. Reciprocation of sieve 17 and air circulation causes chaff to separate from grain and be discharged from combine 11. The grain will fall through both sieves 17 into a collection area where it will be transported to bin 21.

If the combine 11 is cutting on ground that is level in a lateral direction, the combine 11 will not be leaning. The sieve 17 will appear as shown schematically in FIG. 3. All of the sieve sections 29 will be located in a single plane. This plane will be parallel with the sieve frame 23 (FIG. 2). If the combine begins cutting along a terrace or hill side and begins to lean transverse to its longitudinal axis, then inclinometer 43 (FIG. 2) will sense the leaning movement. Inclinometer signals motor 51 to move the sieve sections 29 so as to maintain them horizontal in a lateral direction.

The cable 49 will move the drive member 47 (FIG. 5), which in turn simultaneously pivots the sieve sections 29 about the pivot pins 39. The amount of pivot is selected so as to maintain all of the sieve sections 29 level in a lateral direction. The pivoting is shown in FIG. 4. Each sieve section 29 will be parallel with all of the other sieve sections 29. The plane of each sieve section 29, however will be vertically spaced from the planes of the other sieve sections 29. This creates a stairstep configuration to sieve sections 29. The sieve longitudinal frame members 27 will be leaning with combine 11. Sieve sections 29, being generally horizontal, will not cause grain to pile up along one side.

When the combine 11 returns to a position in which it is not leaning to one side, the inclinometer 53 (FIG. 2) will signal motor 51 to return the sieve sections 29 back to the position shown in FIG. 3.

Figure 5:
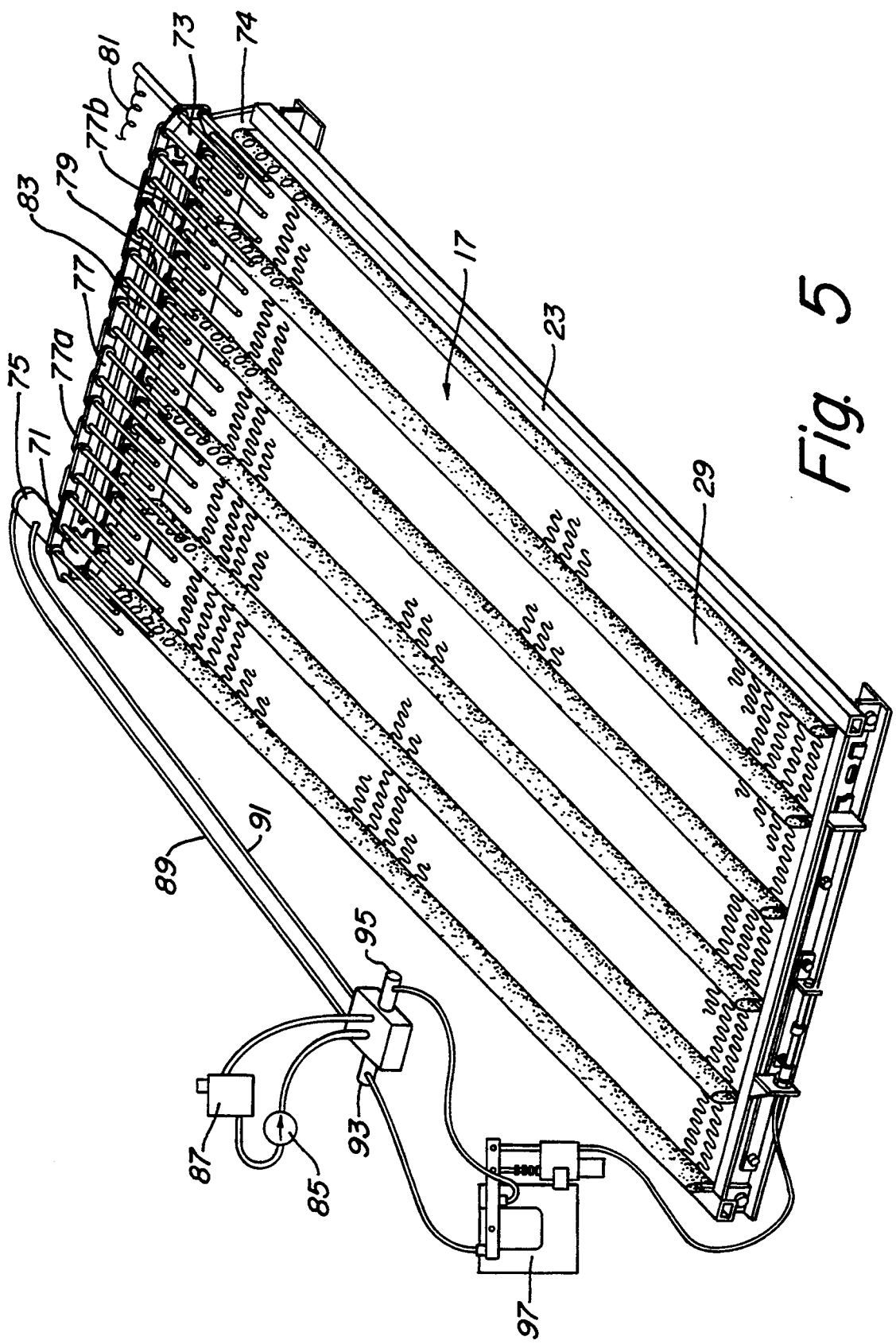
FIG. 5 is a perspective view of an alternate embodiment of the invention, which includes a distributor at the forward end of the sieve.

FIG. 5 illustrates an alternate embodiment. In this embodiment, sieve 17 is identical to sieve 17 of FIGS. 1–4. The addition is a distributor mechanism located at the forward end of sieve 17 to further reduce the build-up of chaff on the lower side of sieve 17 when the combine is leaning. This apparatus includes a pair of sprockets 71, 73. Each sprockets 71, 73 in the embodiment shown is mounted by a bracket 74 to the sieve frame 23. Consequently, sprockets 71, 73 will oscillate in unison with sieve 17. A hydraulic motor 75 is coupled to sprocket 71 to rotate sprocket 71.

A flexible linkage, preferably a chain 77, extends around sprockets 71, 73. Sprocket 71 serves as a drive wheel for chain 77, while sprocket 73 serves as a guide member for chain 77. Chain 77 is in an elongated loop perpendicular to the longitudinal axis of sieve 17. Chain 77 has an upper run 77a and a parallel lower run 77b. Both upper run 77a and lower run 77b are spaced slightly forward of the forward end of sieve frame 23. Runs 77a, 77b are positioned to be contacted by grain and chaff departing the threshing drum 15 (FIG. 1). If a grain distributing shoe (not shown) is employed, runs 77a, 77b will be positioned below the discharge of the distributing shoe. Both upper run 77a and lower run 77b are located at an elevation that is above sieve 17 a short distance. The length of each run 77a, 77b is slightly less than the width of sieve frame 23.

A plurality of fingers 79 are fastened to chain 77 to move with chain 77 as it travels about sprockets 71, 73. Each finger 79 is a straight cylindrical wire, preferably about 3/16ths inch in diameter and ten inches long. Each finger 79 is spaced from adjacent fingers 79 by a distance that is slightly greater than one inch. Fingers 79 are cantilevered from chain 77 and extend rearward over sieve 17. Each fingers 79 will extend several inches over the forward portion of sieve 17. While on the lower run 77b, fingers 79 will be a couple of inches above sieve 17. While on the upper run 77a, fingers 79 will be about four inches above sieve 17. A plane containing fingers 79 on upper run 77a is generally parallel to a plane containing fingers 79 on the lower run 77b, this plane being parallel to the plane of sieve frame 23.

A tensioning spring 81 urges sprocket 73 away from sprocket 71 to maintain tension in chain 77. A guide plate 83 locates between upper run 77a and lower run 77b. The upper and lower runs 77a, 77b slide on guide plate 83, which serves to prevent flopping of the chain 77 during oscillation of sieve 17.

Motor 75 is supplied with hydraulic fluid from a pump 85 to rotate sprocket 71. Pump 85 is connected to hydraulic reservoir 87. Pump 85 will pump through a conduit 89 to rotate hydraulic motor 75 in one direction, such as a clockwise direction. Pump 85 will supply fluid through conduit 91 to rotate hydraulic motor 75 in an opposite direction. A valve 93 has a return position in which it connects conduit 89 to a return line to reservoir 87. Valve 93 has a supply position in which it connects conduit 89 to a supply line connected to pump 85. A valve 95 similarly has a return position and a supply position for conduit 91. One of the conduits 89, 91 serves as a return for the other when the other is supplying hydraulic fluid to motor 75.

An inclinometer 97, similar to inclinometer 53 (FIG. 2), not only controls the sieve sections 29 by maintaining them level, but also controls the supply of hydraulic fluid to motor 75. Inclinometer 97 is set so that at a selected degree of inclination, it will energize pump 85 and actuate control valves 93, 95. For example, if the combine is leaning to the right side at least 10 degrees, inclinometer 97 may actuate valve 95 to supply fluid from hydraulic motor 75 through line 91, and actuate valve 93 to return fluid through conduit 89. Motor 75 will rotate in a direction so that the fingers 79 of upper run 77a move upward toward the left or high side of sieve 17. Consequently, the fingers 79 on lower run 77b will be moving toward the lower side.

Similarly, if the combine leans to the left side, the inclinometer 97 will actuate valves 93, 95 to supply fluid to the other conduit, such as conduit 89, allowing fluid to return through conduit 91. In that case, fingers 79 on upper run 77a will move toward the high, or right side of the combine, while the fingers 79 on lower run 77b will move toward the lower or left side of sieve 17.

Inclinometer 97 is preset so that it will energize pump 85 and actuate the valves 93, 95 only when a selected degree of leaning occurs, such as 10-15 degrees. Also, if desired, pump 85 and motor 75 could be operated at variable speeds, or at least two speeds, such that at higher degrees of leaning, chain 77 will be driven at higher rates of speed. For example, from zero to 10degrees inclination, inclinometer 97 is set so that no rotation of chain 77 occurs. From 10 to 15 degree, chain 77 is driven at a lower speed of about 22 inches per second, linear travel relative to sieve 17. At 15 to 20 degrees inclination, chain 77 is driven at a speed of 36 inches per second.

In operation of the embodiment of FIG. 5, when a selected amount of leaning is sensed by inclinometer 97, it will actuate pump 85 and valves 93, 95 to drive motor 75. Motor 75 will rotate sprocket 71 to move upper run 77a toward the high side of sieve 17. The various sections 29 of sieve 17 will pivot at the same time, as illustrated in FIGS. 3 and 4. The chaff will be agitated and broken up by the moving fingers 79. This reduces tendency for chaff to build up on the lower side of the sieve 17.

The invention has significant advantages. The sieve is maintained in a generally horizontal orientation while the combine leans to one side. This prevents a reduction in the efficiency of the sieve. By dividing the sieve into longitudinal sections, and pivoting each section separately, the space required to level the sieve is much less than prior art proposals which involve levelling the entire sieve frame rather than separate sections. The separate sections allow easy adjustment of the fingers simultaneously for different crops. The distributor reduces the tendency for chaff to build up on the lower side of the sieve. The distributor breaks up clumps of chaff and facilitates the flow of chaff out of the combine.

While the invention has been shown in only one of its forms, it should be apparent to those skilled in the art that it is not so limited, but is susceptible to various changes without departing from the scope of the invention.

I claim:

1. An apparatus for distributing grain onto a sieve of a combine:
    a rotatable drive wheel;
    a guide member spaced from the drive wheel;
    a flexible linkage member extending around the wheel and the guide member in an elongated loop, defining an upper run and a lower run;
    a plurality of fingers mounted to and extending from the linkage member;
    mounting means for mounting the drive wheel and guide member to the combine adjacent a forward portion of the sieve with the linkage member extending transverse to the sieve and the fingers on at least one of the runs positioned above a forward portion of the sieve for contact by grain and chaff falling onto the sieve;
    drive means for rotating the drive wheel to cause the linkage member to travel around the drive wheel and guide member and the fingers to move laterally across the forward portion of the sieve; and
    level means for sensing leaning of the combine and controlling the drive means in response thereto to rotate the drive wheel when the combine leans to a selected degree, for reducing build-up of chaff on a low side of the sieve.

2. The apparatus according to claim 1 wherein the mounting means mounts both of the runs of the linkage member above the forward portion of the sieve.

3. The apparatus according to claim 1 wherein the level means causes the drive wheel to rotate in one direction when the combine leans to a right side and causes the drive wheel to rotate in an opposite direction when the combine leans to a second side.

4. The apparatus according to claim 1 wherein the mounting means mounts the fingers of each run in planes substantially parallel with the sieve.

5. The apparatus according to claim 1 wherein the linkage member is a chain and the drive wheel is a sprocket.

6. The apparatus according to claim 1 wherein the linkage member is a chain and the drive wheel and guide member are sprockets.

7. The apparatus according to claim 1 wherein the linkage member is a chain and wherein the fingers comprise straight wires secured to the chain.

8. The apparatus according to claim 1 wherein the mounting means mounts both of the runs of the linkage member above the forward portion of the sieve, and wherein the level means rotates the wheel to cause the upper run to travel in a direction away from the low side of the sieve, resulting in the lower run travelling toward the low side of the sieve.

9. The apparatus according to claim 1 wherein the sieve comprises:
    a plurality of sections extending along a longitudinal axis, each of the sections having a plurality of fingers for directing chaff rearward and for allowing grain to fall through the sieve; and
    pivot means for pivoting each of the sections about a separate pivot axis that is parallel to the longitudinal axis of the combine and laterally spaced from the pivot axes of the other sections, in response to leaning of the combine in a direction transverse to the longitudinal axis in order to maintain the sections level.

10. The apparatus according to claim 1 wherein the sieve is driven in oscillation in the combine and wherein the mounting means mounts the drive wheel, linkage member, and guide member to the sieve for oscillation therewith.

11. The apparatus according to claim 1 wherein the length of each of the runs is less than the width of the sieve.

12. In a combine having a frame, a longitudinal axis, a threshing drum carried rotatably by the frame for threshing grain, a sieve located below the threshing drum and driven in oscillation, and blower means for discharging air upward through the sieve to separate chaff from grain, the improvement comprising in combination:

a rotatable drive wheel mounted adjacent a forward end of the sieve;

a guide member spaced laterally from the drive wheel relative to the longitudinal axis;

a flexible linkage member extending around the drive wheel and the guide member in an elongated loop, defining an upper run and a lower run which extend perpendicular to the longitudinal axis at the forward end of the sieve;

a plurality of fingers mounted to, spaced laterally apart from each other and extending rearward from the linkage member in a longitudinal direction so as to pass over a forward portion of the sieve during operation for contact by grain and chaff falling onto the sieve;

drive means for rotating the drive wheel selectively in both rotational directions to cause the linkage member to travel around the drive wheel and guide member and the fingers to move laterally across the forward portion of the sieve; and level means for sensing leaning of the combine in directions transverse to the longitudinal axis and for controlling the drive means in response thereto to rotate the drive wheel when the combine leans to a selected degree, for reducing build-up of chaff on a low side of the sieve.

13. The combine according to claim 12 wherein both of the runs of the linkage member are located above the forward portion of the sieve.

14. The apparatus according to claim 12 wherein the linkage member is a chain and the drive wheel and guide member are sprockets.

15. The combine according to claim 12 wherein the fingers comprise straight wires.

16. The combine according to claim 12 wherein both of the runs of the linkage member are located above the forward portion of the sieve, and wherein the level means rotates the drive wheel to cause the upper run to travel in a direction away from the low side of the sieve, resulting in the lower run travelling toward the low side of the sieve.

17. The combine according to claim 12 wherein the sieve comprises:

a plurality of sections extending along a longitudinal axis, each of the sections having a plurality of fingers for directing chaff rearward and for allowing grain to fall through the sieve; and pivot means for pivoting each of the sections about a separate pivot axis that is parallel to the longitudinal axis of the combine and laterally spaced from the pivot axes of the other sections, in response to leaning of the combine in a direction transverse to the longitudinal axis in order to maintain the sections level.

18. The combine according to claim 12 wherein the sieve is driven in oscillation in the combine and wherein the drive wheel, linkage member, and guide member are mounted to the sieve for oscillation therewith.

19. In a combine having a frame, a longitudinal axis, a threshing drum carried rotatably by the frame for threshing grain, a sieve located below the threshing drum and driven in oscillation, and blower means for discharging air upward through the sieve to separate chaff from grain, the improvement comprising in combination:

a pair of sprockets mounted adjacent a forward end of the sieve and laterally spaced apart from each other relative to the longitudinal axis;

a chain extending around the sprockets in an elongated loop, defining an upper run and a lower run which extend perpendicular to the longitudinal axis at the forward end of the sieve;

a plurality of fingers mounted to, spaced laterally apart from each other and extending rearward from the chain in a longitudinal direction, the fingers of both runs passing over a forward portion of the sieve for contact by grain and chaff falling onto the sieve;

drive means for rotating one of the sprockets selectively in both rotational directions to cause the fingers to move laterally across the forward portion of the sieve; and level means for sensing leaning of the combine in directions transverse to the longitudinal axis and for controlling the drive means in response thereto to move the fingers on the upper run toward a high side of the sieve when the combine leans to a selected degree, for reducing build-up of chaff on a low side of the sieve.

20. The combine according to claim 19 wherein the fingers comprise straight wires.

21. The combine according to claim 19 wherein the sieve comprises:

a plurality of sections extending along a longitudinal axis, each of the sections having a plurality of fingers for directing chaff rearward and for allowing grain to fall through the sieve; and pivot means for pivoting each of the sections about a separate pivot axis that is parallel to the longitudinal axis of the combine and laterally spaced from the pivot axes of the other sections, in response to leaning of the combine in a direction transverse to the longitudinal axis in order to maintain the sections level.

22. The combine according to claim 19 wherein the sieve is driven in oscillation in the combine and wherein the sprockets, chain and fingers are mounted to the sieve for oscillation therewith.

23. An apparatus for distributing grain onto a sieve of a combine which has a longitudinal axis, comprising in combination:

a plurality of fingers mounted above and extending over the forward portion of the sieve;

finger drive means for moving the fingers in directions perpendicular to the longitudinal axis over the forward portion of the sieve, the fingers being mounted to the finger drive means for contact by grain and chaff falling onto the sieve; and level means for sensing leaning of the combine and controlling the drive means in response thereto to cause the drive means to move the fingers over the sieve, for reducing build-up of grain and chaff on the sieve.

24. An apparatus for distributing grain onto a sieve of a combine, comprising in combination:

a plurality of fingers mounted above and extending over the forward position of the sieve;

finger drive means for moving the fingers over the forward portion of the sieve, the fingers being mounted to the finger drive means for contact by grain and chaff falling on the sieve; and level means for sensing leaning of the combine and controlling the drive means in response thereto to cause the drive means to move the fingers over the sieve, for reducing build-up of grain and chaff on the sieve; and wherein the finger drive means comprises:

a rotatable drive wheel;

at least one guide member spaced apart from the drive wheel; and a flexible linkage extending around the drive wheel and the guide member.

25. The apparatus of claim 24, further comprising: mounting means for mounting the drive wheel and guide member to the combine adjacent the forward portion of the sieve with the linkage member extending transverse to the sieve.

26. The apparatus of claim 23 wherein the fingers comprise straight wires.

27. In a combine having a frame, a longitudinal axis, a threshing drum carried rotatably by the frame for threshing grain, a sieve located below the threshing drum and driven in oscillation, and blower means for discharging air upward through the sieve to separate chaff from grain, the improvement comprising in combination:

a plurality of fingers mounted above and extending over the forward portion of the sieve, each of the fingers comprising a substantially straight rod extending parallel with the longitudinal axis;

finger drive means for moving the fingers in directions perpendicular to the longitudinal axis over the forward portion of the sieve, the fingers being mounted to the finger drive means for contact by grain and chaff falling onto the sieve; and level means for sensing leaning of the combine and controlling the drive means in response thereto to cause the drive means to move the fingers over the sieve, for reducing build-up of grain and chaff on the sieve.

28. In a combine having a frame, a longitudinal axis, a threshing drum carried rotatably by the frame for threshing grain, a sieve located below the threshing drum and driven in oscillation, and blower means for discharging air upward through the sieve to separate chaff from grain, the improvement comprising in combination:

a plurality of fingers mounted above and extending over the forward portion of the sieve, each of the fingers comprising a substantially straight rod extending parallel with the longitudinal axis;

finger drive means for moving the fingers transverse to the longitudinal axis over the forward portion of the sieve, the fingers being mounted to the finger drive means for contact by grain and chaff falling on the sieve; and level means for sensing leaning of the combine and controlling the drive means in response thereto to cause the drive means to move the fingers over the sieve, for reducing build-up of grain and chaff on the sieve; and wherein the finger drive means comprises:

a rotatable drive wheel; at least one guide member spaced apart from the drive wheel; and a flexible linkage extending around the drive wheel and the guide member.

29. The combine of claim 27 wherein the sieve comprises:

a plurality of sections extending along a longitudinal axis, each of the sections having a plurality of fingers for directing chaff rearward and for allowing grain to fall through the sieve; and pivot means for pivoting each of the sections about a separate pivot axis that is parallel to the longitudinal axis of the combine and laterally spaced from the pivot axes of the other sections, in response to leaning of the combine in a direction transverse to the longitudinal axis in order to maintain the sections level.

30. The combine of claim 28 wherein the sieve is driven in oscillation in the combine and wherein the drive wheel, guide member and linkage member are mounted to the sieve for oscillation therewith.

* * * * *